INVENTOR.
K. H. HACHMUTH
BY Hudson & Young
ATTORNEYS

Patented July 15, 1952

2,603,305

UNITED STATES PATENT OFFICE 2,603,305

CENTRIFUGAL APPARATUS FOR COUNTERCURRENT GAS ABSORPTION

Karl H. Hachmuth, Bartlesville, Okla., assignor to Phillips Petroleum Company, a corporation of Delaware Application December 13, 1948, Serial No. 64,963

13 Claims. (Cl. 183—2)

This invention relates to a method of and apparatus for countercurrent absorption. In another aspect, it relates to a method of and apparatus for converting the energy contained in high pressure absorption fluid to mechanical work.

Gaseous mixtures such as hydrogen-methane, hydrogen-nitrogen-carbon dioxide, and hydrogen-carbon monoxide-carbon dioxide require the use of a large amount of absorbent and a high pressure to remove one of the constituents from the mixture due to the low solubility of these compounds in absorption liquids. In the subsequent stripping step, in which the absorbed gas is disengaged from the absorption liquid, a considerably lower pressure is used. This large pressure difference, together with the relatively great amount of absorption fluid, results in a large energy requirement for the apparatus. Further, in conventional absorption processes, it is difficult to satisfactorily handle mixtures in which there is a high ratio of absorbent liquid to the gas component to be extracted.

It is an object of this invention to provide a method of and apparatus for such absorption processes in which the power requirements are substantially reduced while still obtaining a highly efficient contacting action between the absorption liquid and the gas.

It is a further object of the invention to provide a method of and apparatus for converting the energy stored in the high pressure absorption liquid to mechanical energy which is used to reduce the outside energy requirement of the system.

It is a still further object to provide apparatus which is of simple construction, economical to build and operate, rugged and durable.

Various other objects, advantages and features of the invention will be apparent from the following detailed description taken in conjunction with the accompanying drawings, in which.

Figure 1:
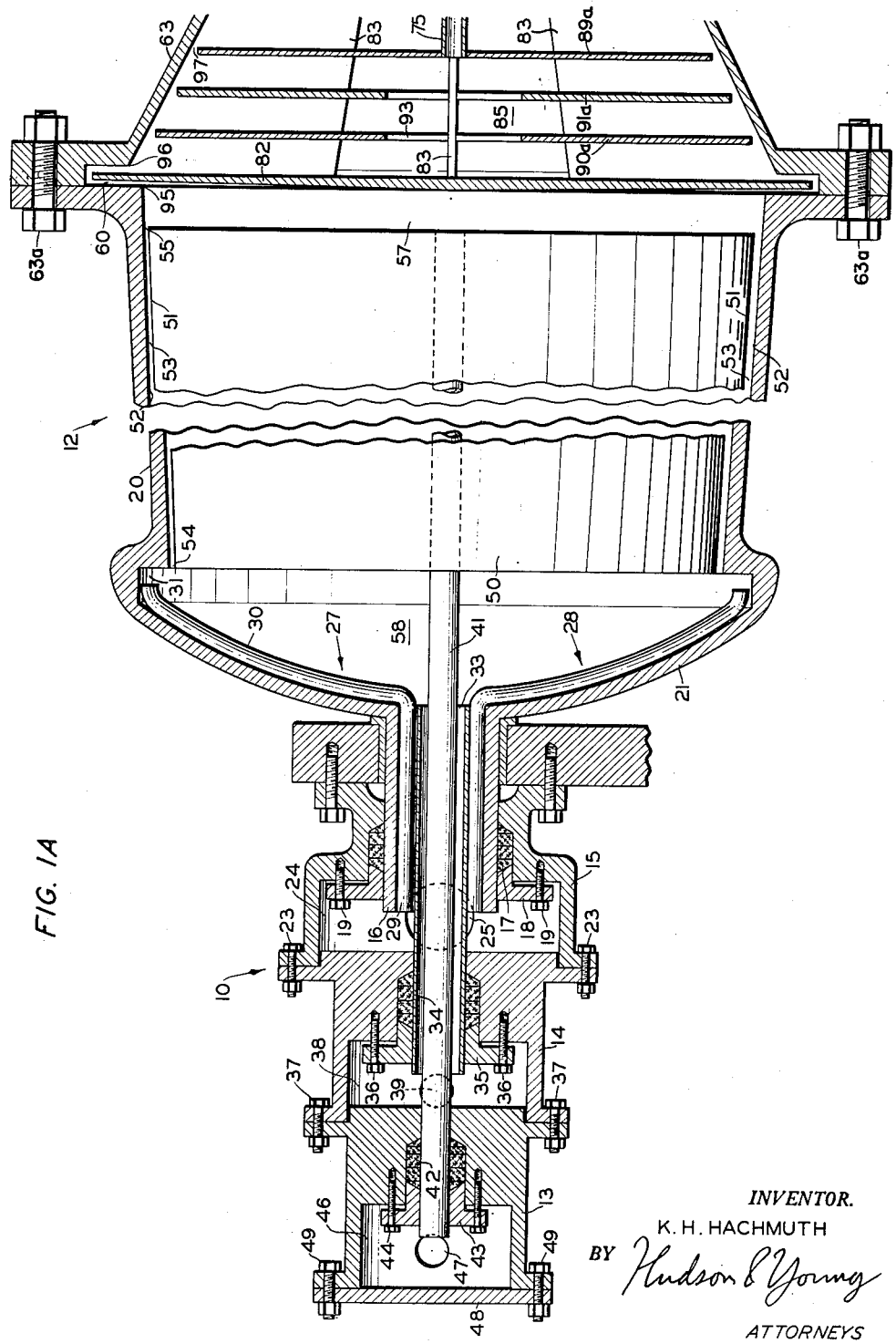
Figures 1A and 1B are, collectively, a vertical sectional view of the absorption apparatus.

Referring now to the drawings in detail, and particularly to Figures 1A and 1B, the apparatus includes a pair of stationary supports 10 and 11 in which is journalled a rotatable assembly 12. The support 10 includes bearing blocks 13, 14 and 15 which are of progressively increasing size and diameter. An enlarged tubular member 16 is journalled in bearing block 15 and, to this end, packing rings 17 are disposed about the exterior surface of the tubular member, and a packing gland 18 is provided to hold the rings 17 in position, the pressure of the gland upon the rings being regulated by bolts 19. The sleeve 16 is integral with a generally frusto-conical shell 20 and a flared portion 21 interconnecting the tubular member and the shell.

The bearing block 15 is secured to a flanged portion of bearing block 14 by bolts 23 and, in this manner, a chamber 24 is formed within the bearing block 15, this chamber communicating with a liquid inlet 25. A set of conduits 27, 28 are provided for conveying liquid from the chamber 24 to the peripheral regions of the conical shell 20 and, to this end, each conduit includes a straight portion 29 suitably secured to the inner surface of the tubular member 16 and extending longitudinally from the chamber 24 to the flared portion 21. Each conduit further includes an arcuate part 30 extending from the center to the periphery of the flared portion 21, this conduit being adapted to discharge liquid from the chamber 24 into an annular recessed part 31 of the flared portion 21. The conduits should be sufficiently small as to impart a great enough velocity to the liquid to prevent vapor locking.

A sleeve 33 is journalled in bearing block 14 in concentric relation to tubular member 16. The bearing block 14 is provided with packing rings 34, a packing gland 35, and bolts 36 of similar construction to those described in connection with bearing block 15 but of smaller diameter, and it is secured to a flanged portion of bearing block 13 by bolts 37, thereby defining a chamber 38 communicating with a gas outlet 39. Thus, one end of the sleeve 33 is journalled in bearing block 14 and is in communication with chamber 38 and outlet 39. The other end of the sleeve is suitably secured, as by brazing or soldering, to the inner surfaces of conduits 27 and 28. Accordingly, gas passing into the flared portion 21 from the reduced end of the frusto-conical shell 20 may be exhausted through sleeve 33, chamber 38, and outlet 39. The space between conduits 27, 28 in the region between sleeve 33 and tubular member 16 is filled with a suitable packing material to prevent gas flowing from the flared portion 21 back into the chamber 24.

A tubular shaft 41 is journalled in bearing block 13 in a manner similar to that described in connection with bearing blocks 14 and 15. To this end, bearing block 13 is provided with packing rings 42, a packing gland 43, and bolts 44 to hold the gland in engagement with the packing rings and it is shaped to form a chamber 46 having an inlet 47 for gas to be treated. The chamber 46 is closed by a plate 48 which is secured to bearing block 13 by bolts 49. In this manner, one end of the shaft 41 is journalled in bearing block 13 and is adapted to receive gas passing through inlet 47 into chamber 46. The other end of shaft 41 carries a drum 50 having a tapered or frusto-conical peripheral surface 51. This drum is rotatable with shaft 41 and frusto-conical shell 20, and in order to obtain mechanical rigidity, the drum may be secured to the shell by any suitable fixtures, not shown, or it may be attached by suitable spokes to a rotatable disc to be hereinafter described.

The frusto-conical outer surface of drum 50 is complementary with the inner frusto-conical surface 52 of shell 20 and defines therewith a narrow annular passage 53 which progressively increases in diameter from its reduced end 54 to its enlarged end 55. The ends of the drum 50 are closed except for small perforations, not shown, which may be provided to equalize the pressures interiorly and exteriorly of the drum.

It will be apparent that the apparatus just described is adapted to provide efficient countercurrent contacting between a gas to be treated and a suitable liquid absorbent. Assuming that the shell 20 and drum 50 are rotating at high velocity, gas to be treated is admitted through inlet 47, chamber 46, and tubular shaft 41 to a chamber 57 at the enlarged end of shell 20. Thereupon, the gas passes through the annular passage 53 to a chamber 58 defined by flared portion 21 at the reduced end of the shell, the gas passing from chamber 58 through sleeve 33 and chamber 38 to outlet 39. Simultaneously, a suitable absorbent liquid is admitted through inlet 25, chamber 24, and conduits 27, 28 to the peripheral region of chamber 58. The liquid is, of course, urged toward the periphery of the shell by centrifugal force and, when a sufficient amount has accumulated at the region 31, the liquid enters the reduced end of passage 53 and passes through the passage to the enlarged end 55 from which it traverses an annular well 60 to desorption apparatus to be described later.

It will be noted that the passage 53 is inclined with respect to the axis of rotation of the shell 20. Due to this inclination of the passage, the centrifugal force imparted to the liquid by rotation of the assembly 12 causes the liquid to form a thin film upon the surface 52 of the shell and this liquid film is moved toward the enlarged end of the passage 55 against the oppositely directed pressure of the gas due to the aforesaid centrifugal action, which is also sufficient to overcome the friction between the thin liquid film and the vessel wall.

The gas flowing countercurrently from the enlarged end 55 to the reduced end 54 of the passage forms a thin film adjacent the drum surface 51. These liquid and gas films contact each other at a substantial rate of speed and with considerable turbulence so that equilibrium conditions may be readily obtained between the gas and absorbent by the use of an absorption zone of reasonable length. When applied to an extraction process, one component of a feed gas entering the enlarged end 55 of the passage is preferentially absorbed by countercurrent contact with the liquid absorbent. The lean gas, which is depleted of the absorbed component, passes from the reduced end 54 into the chamber 58 and out through sleeve 33 while the absorbent liquid, at high pressure, with its absorbed gas, passes outwardly from the enlarged end 55 to the annular well 60.

In order to insure that the liquid film is uniformly distributed about the periphery of shell 20, a small inwardly protruding ridge, not shown, may be provided at the reduced end 54 of the passage, this ridge being notched at intervals around its periphery. This construction provides reasonably uniform distribution of the absorbent around the periphery, even if the vessel is not exactly centered. Without such construction, a slight eccentricity may cause the absorbent to be unevenly distributed within the passage 53 which is undesirable for obvious reasons.

The rotatable assembly 12 also includes a second frusto-conical shell 62 wherein the absorbed gas is stripped from the absorption liquid, and the stored energy in the absorption liquid is converted into mechanical work which is utilized to effect rotation of the assembly 12. This second shell is of substantially greater pitch than shell 20. The enlarged end 63 of shell 62 is secured to the enlarged end of shell 20 by bolts 63a while the reduced end 64 of shell 62 merges into an enlarged tubular member 65 which is journalled in bearing structure 11. To this end, bearing structure 11 includes a bearing block 66 secured to a support 66a by bolts 66b and containing packing rings 67 which are engaged by a packing gland 68 adjustably secured to the bearing block 66 by bolts 69. The bearing block 66 is shaped to form a chamber 70 having an outlet 71, and this chamber is closed by a bearing block 72 which is secured to bearing block 66 by bolts 73. The tubular member 65 is also provided with a driving sheave 74 by which the rotatable assembly may be connected to a suitable source of power, such as a synchronous electric motor.

A tubular shaft 75 is disposed concentrically with the shell 62 and one end of this shaft is journalled in bearing block 72 by packing rings 73a, packing gland 74a, and bolts 75a. Bearing block 72 is shaped to form a chamber 76 communicating with the adjacent end of shaft 75 and this chamber is closed by a disc 77 secured to bearing block 72 by bolts 78, the chamber being provided with an outlet 79 for removing desorbed gases from the assembly. Spaced from the other end of shaft 75 is a disc 82, the peripheral regions of which protrude into the previously mentioned annular well 60 formed at the enlarged end 63 of shell 62. This disc 82 is supported by a series of longitudinal vanes 83 and it may be mechanically connected to drum 50, as previously mentioned, to provide mechanical rigidity. Any desired number of vanes 83 may be provided, four being shown in the figure. It will be noted that each vane has its peripheral edge secured to the shell 62 and that each vane is of progressively decreasing width proceeding from the enlarged end 63 to the reduced end 64 of the shell 62, the enlarged end of each vane being secured to the disc 82 and the reduced end terminating in a triangular portion 84 secured to the reduced end 64. The inner edge of each vane 83 is tapered so that it is spaced further from the shaft at the enlarged end 63 of the shell than at the reduced end.

The space within the shell is divided into a series of compartments 85, 86, 87, and 88 by a series of main transverse partitions or baffles 89a, 89b, 89c, and 89d, these partitions being secured to and rotatable with the shaft 75, and each such baffle is also secured to the longitudinal vanes 83. The periphery of each baffle is spaced a predetermined distance from the inner surface of the shell 62.

A pair of lateral subsidiary baffles 90a, 91a; 90b, 91b; 90c, 91c; 90d, 91d; and 90e, are disposed in each of the chambers 85 to 88, inclusive, the baffle 90e being disposed between main baffle 89d and the tubular member 65. Each of the baffles 90, 91 is secured to and supported by the longitudinal vanes 83, and the periphery of each subsidiary baffle is closely spaced to the inner surface of shell 62 in the same manner as the main lateral baffles 89. Each subsidiary baffle has an enlarged central opening, as indicated at 93, to permit free flow of gas in an axial direction within the compartments 85 to 89, inclusive. Relief valves 94b, 94c and 94d are disposed at the central region of the respective main baffles 89b, 89c and 89d to provide a predetermined pressure drop between adjacent compartments. Although one relief valve is shown in each main baffle, it is usually desirable that two or more such valves be provided and that they be symmetrically disposed about the axis of the shaft, in order to maintain dynamic balance during rotation of the assembly. In some cases, however, the valves may be replaced by openings of such size as to maintain a predetermined pressure drop between adjacent compartments during operation of the apparatus.

The operation of the desorption or stripper unit will now be apparent to those skilled in the art. Assuming that the assembly is rotating, liquid absorbent containing absorbed gas at high pressure enters the shell 62 through annular well 60. The annular space is of such size that the level of liquid therein is intermediate the inner surface 95 of shell 20 and the inner surface 96 of shell 62 so that a liquid seal is effected between the two shells to prevent passage of gas therebetween. The liquid absorbent containing gas at high pressure then passes successively through the compartments 85 to 88, inclusive, through the passages 97 between the main baffles 89 and the shell 62, it being understood that the liquid is maintained at the peripheral region of shell 62 by centrifugal force. Accordingly, the continuous liquid phase at the periphery of the shell prevents passage of gas between the compartments 85 to 88 except when there is a sufficient pressure differential as to operate relief valves 94. The size of the openings 97 is so regulated that a substantial volume of fluid is continuously disposed within each of the compartments 85 to 88, inclusive, although the fluid level should not be located closer to the axis of rotation than the inner surfaces of longitudinal vanes 83.

The pressures within the compartments 85 to 88, inclusive, are successively lower proceeding from compartment 85 to compartment 88. As a result, a portion of the absorbed gas is released from the liquid in each of the compartments as the apparatus is operated. Normally, this gas evolution causes foaming of the absorbent liquid in each of the compartments 85 to 88. The longitudinal vanes 83 prevent this foaming liquid from rotating faster than the shell 62 and thereby convert the energy stored in the high pressure liquid to mechanical work tending to cause rotation of the shell 62. The main and subsidiary transverse baffles 89, 90 and 91 prevent turbulence and wasted energy as the gas is released from the absorbent liquid so that the stored energy of the liquid and gas is utilized efficiently to rotate the assembly.

As previously stated, the oil and gas mixture entering compartment 85 through annular well 60 is at high pressure and, accordingly, gas at high pressure is evolved therefrom as the liquid engages the longitudinal vanes 83 and baffles 89a, 90a, and 91a. This high pressure gas passes through tubular shaft 75 into the chamber 76 from which it is removed through outlet 79. Liquid from compartment 85 containing a smaller portion of absorbed gas passes through the opening 97 between baffle 89a and shell 62 at reduced pressure, since a portion of the gas was removed therefrom and a portion of its stored energy was converted into mechanical work in compartment 85. In compartment 86, gas is evolved at lower pressure than in compartment 85 and an additional portion of the stored energy in the absorbent liquid is converted into mechanical work by the vanes 83 and baffles 89b, 90b and 91b. Accordingly, the pressure of the gas liquid mixture flowing from compartment 86 into compartment 87 through channel 97 is still further reduced. In similar fashion, gas at progressively lower pressure is evolved in compartments 87 and 88 and substantially all the remaining stored energy of the gas-liquid mixture is converted into mechanical work by the longitudinal vanes and transverse baffles. In addition, the liquid entering sleeve 65 has been stripped of substantially all its absorbed gas. There is also a flow of gas in an axial direction through the shell 62, the gas in compartment 86 passing into compartment 87 when the pressure differential between them is sufficient to operate relief valve 94b. In similar fashion, the gas from compartment 87 passes into compartment 88 when the pressure differential between them is sufficient to operate relief valve 94c, and the gas from compartment 88 passes into the tubular sleeve 65 when the pressure between it and compartment 88 is sufficient to operate relief valve 94d. As a result, a mixture of absorbent liquid and desorbed gases passes at low pressure through sleeve 65 into the chamber 70 from which it is removed through outlet 71.

In the described embodiment of the invention, the gas from compartment 85 is removed separately through tubular shaft 75 while the gases from compartments 86 to 88, inclusive, are combined and finally are removed through sleeve 65. It is within the scope of the invention to remove the gases separately from each of the compartments, or from any desired combination of compartments. For example, if it is desired to separately remove the gas from compartment 86, a concentric sleeve is provided for shaft 75, and the gas from compartment 86 is removed through the interspace between this sleeve and shaft 75. Alternatively, the gas evolved in compartment 85 may be removed in the same manner as the gas evolved in compartments 86 to 88, inclusive, by eliminating shaft 75 and providing relief valves in main baffle 89a.

The operating pressures of the compartments, the number and size of compartments, and the manner of removal of the gas may be varied in accordance with the feed gas composition, the degree of separation desired, the foaming and supersaturation tendencies of the absorbent, the purpose for which the evolved gas is to be used, the requisite simplicity of design, and speed of rotation. The effect of all these factors, except the foaming and supersaturation tendencies of the absorbent, ordinarily may be evaluated from phase equilibrium data, and density data, but the effect of the foaming and supersaturation tendencies of the absorbent must ordinarily be evaluated by trial runs before the apparatus is put into commercial operation.

In the overall operation of the apparatus, it will be noted that gas to be treated is passed into annular passage 53 from shaft 41 and chamber 46, the gas being contacted in the passage 53 by a countercurrently moving film of liquid absorbent which selectively absorbs one component of the gaseous mixture. The spent gas, from which the absorbed component has been removed, is withdrawn through chamber 58, sleeve 53, and chamber 38 while liquid containing absorbed gas at high pressure passes through annular well 60 and, thence, successively through the compartments 85 to 88, inclusive. In each compartment, portions of the absorbed gas are removed at successively lower pressure levels, and a portion of the energy of the gas-liquid phase is converted into mechanical work which is utilized to effect rotation of the assembly. The desorbed liquid and the stripped gases are then removed from the apparatus in any desired manner, the liquid being recycled, and the stripped gas being passed to market or to another stage of the process.

In order to maintain rotation of the absorber at a constant speed and to make up any discrepancy between the driving energy of the liquid in shell 62 and the energy requirement of the oil in shell 20, a positive drive is applied to the assembly 12. I prefer to utilize a synchronous motor, connection to this motor being made by the driving sheave 74. The motor is sufficiently powerful and the drive sufficiently positive to maintain a constant speed of rotation without permitting appreciable slowing or speeding of the equipment. This effectively prevents difficulties which might otherwise arise due to surging.

In the example described, unless special high strength alloys or special construction methods are used, the speed of rotation for a given diameter and, hence, the internal pressure is limited to a certain maximum by the allowable stress in the shell of the vessel. Where the vessel is two feet in diameter, this limit is about 3600 revolutions per minute, corresponding to a pressure of about 500 pounds per square inch, gauge. A smaller diameter vessel may be rotated at a higher speed and higher pressure while a larger diameter vessel should be limited to lower speeds and lower pressures. By enclosing the rotating vessel in a larger pressure-tight vessel maintained at the same pressure as the gas in the rotating vessel, operating pressures may be increased to about 1000 pounds per square inch, gauge, for the size equipment in the example, the speed being increased correspondingly.

It is to be understood that the packing glands, housing, bearings and other details of construction as shown in Figure 1 are illustrative only. In many cases ball or roller bearings are preferred to the simple friction bearings as shown. Packings may be of the Duraseal type with suitable sealing fluids used in conjunction therewith. Where packings of the type illustrated are used, provision should be made for tightening the packing from outside, so that it is not necessary to disassemble the housings to adjust the packing gland bolts. This may be done by extending the packing gland studs through small individual packing glands to the exterior of the housing.

It is a feature of the invention that packing problems are not serious in this apparatus. All packing leaking to the exterior of the machine handles comparatively low pressure liquid streams. A slight leak in the packing between the gas stream in shaft 75 and the stream in shell 65 is of no importance since the two streams are ultimately mixed. Leakage from the chamber 38 through the packing 34 may be removed by a suitable bleeder line, not shown, with no detrimental effect on the inlet liquid since the liquid will immediately contact the same gas in the passage 53. Leaks between chambers 38 and 46 are negligible due to near equality in the pressures.

As a specific example, the use of the apparatus is described in separating the components of a gaseous mixture consisting of 50 per cent hydrogen and 50 per cent methane. Approximately 500,000 cubic feet per day of feed stock is fed through line 100, Figure 3, to chamber 46, at a pressure of 515 pounds per square inch. All pressures referred to in this specification are pounds per square inch gauge. This gas passes through shaft 41 and chamber 57, Figure 1, to annular passage 53 wherein it is contacted with mineral seal oil which is fed through line 101, Figure 3, at a pressure of 110 pounds per square inch gauge, and at a rate of 13,350 gallons of oil per hour, this absorbent passing through chamber 24, and conduits 27, 28 to the reduced end 54 of the annular passage. The assembly 12 is rotated at a speed of 3600 revolutions per minute, the width of the passage 53 is $\frac{1}{16}$ inch, while the diameter at the reduced end 54 is 1.84 feet, and at the enlarged end 55, the diameter is 2 feet. The length of the passage is 6 feet so that the taper of the passage is approximately .026 foot per foot of length. Under these conditions, a centrifugal force is imparted to the oil equivalent to a pressure of 500 pounds per square inch and the absorbent forms a liquid film having a thickness of $\frac{1}{32}$ inch at the outer surface of the passage 53 while the width of the gas film is, accordingly, also approximately $\frac{1}{32}$ inch. These thin films flowing under very turbulent conditions provide substantially an equilibrium contact between the oil and gas, so that the depleted gas flowing through chamber 58, sleeve 33, and chamber 38 has a composition of approximately 95 per cent hydrogen and 5 per cent methane, a pressure of 515 pounds per square inch, and a flow rate of 211,000 cubic feet per day. The pressure imparted to the oil by the centrifugal force is ample to overcome frictional resistance against the vessel wall and to move it from the reduced end 54 to the enlarged end 55 against the pressure of the countercurrently flowing gas.

The oil containing absorbed methane passes through the annular well 60, Figure 1, and a difference of 1 inch in the level of oil between the shells 20 and 62 is equivalent to a pressure variation of 90 pounds per square inch. The pressure in the compartment 85 is 380 pounds per square inch and, as a result, the gas evolved in this compartment leaves the apparatus through shaft 75, chamber 76, and line 103, Figure 3, at a pressure of 380 pounds per square inch. The oil from compartment 85 passes into compartment 86 in which the pressure is 230 pounds per square inch, the size of the opening 97 between the shell 62 and baffle 89a being such that the centrifugal force on the oil at this point plus the outlet pressure, plus small friction losses, balances the 380 pounds per square inch pressure in compartment 85. If this balance is not perfect, no serious results will occur. If the pressure is too high in the chamber, some of the evolved gas will escape around partition 89a to the next chamber without harmful results in equipment performance. If the pressure is too low, the oil level will be appreciably inside the periphery of partition 89a but will flow into the next chamber properly once this higher level has been established. The only noticeable effect will be to withdraw more gas in the first chamber at the expense of the second chamber. If the unbalance is too great, oil might be lost through the central conduit 75 because of high foam level in the compartment 85.

Figure 2:
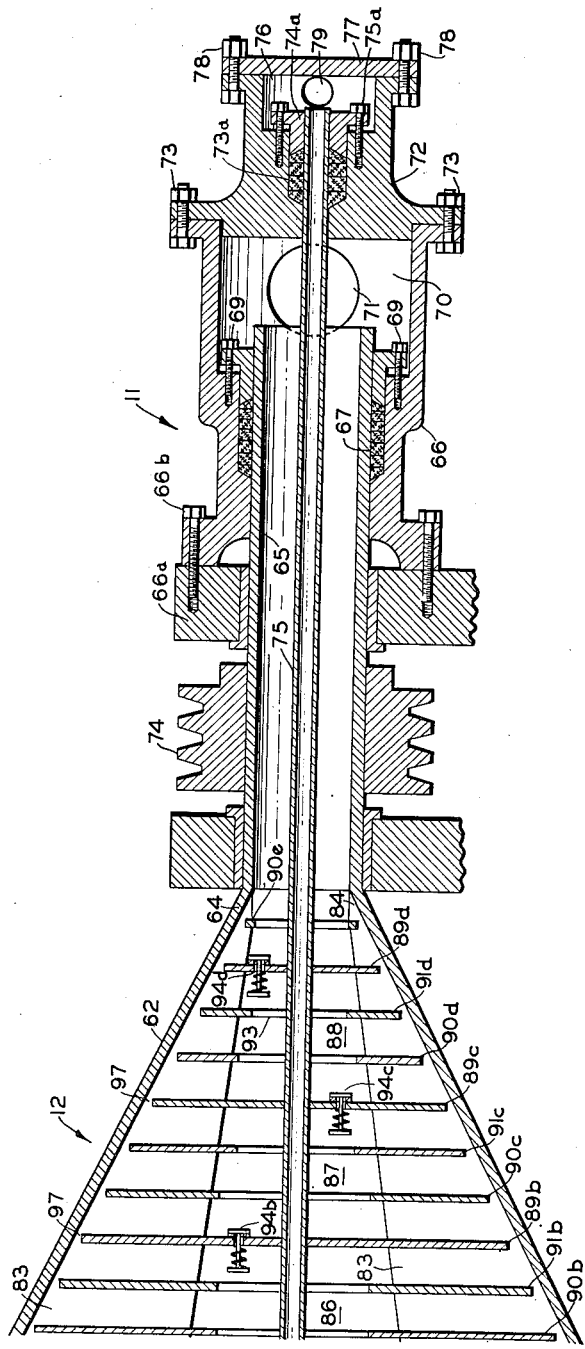
Figure 2 is a view illustrating the assembly of Figure 1 in elevation on a reduced scale.

Similar conditions prevail in compartments 87 and 88, the pressure in compartment 87 being 130 pounds per square inch, and the pressure in compartment 88 being 60 pounds per square inch. The pressure in the tubular sleeve 65 may be 20 pounds per square inch so that the oil-gas mixture discharged through chamber 70, outlet 71, and line 104, Figure 2, has a pressure of 20 pounds per square inch. The relief valves 94 are adjusted so as to maintain the pressures previously noted in the respective compartments 86 to 88, inclusive. The gas liquid stream passing through line 104 is charged to a separating tower 105 at the top region thereof and the gas stream from line 103 is charged to the bottom region of the tower. The tower may be operated at a pressure of 5 pounds per square inch and an overhead product consisting of 17 per cent hydrogen and 83 per cent methane is withdrawn through line 107, while the stripped oil is withdrawn through line 108 as a bottoms product. In this separator, the expanded gas at high pressure flows countercurrently to the descending oil thereby aiding in liberating the dissolved gas in the oil due to the resulting agitation, and this stream also tends to reduce the residual methane in the lean oil by contacting the oil, before it leaves the separator, with a gas stream leaner in methane than the last gas released by the oil in a simple flash operation. The bottoms product passing from line 108 is recycled through a pump 109 to line 101, this pump raising the oil pressure to the value of 110 pounds per square inch, as required for charging the contacting apparatus 12.

Figure 3:
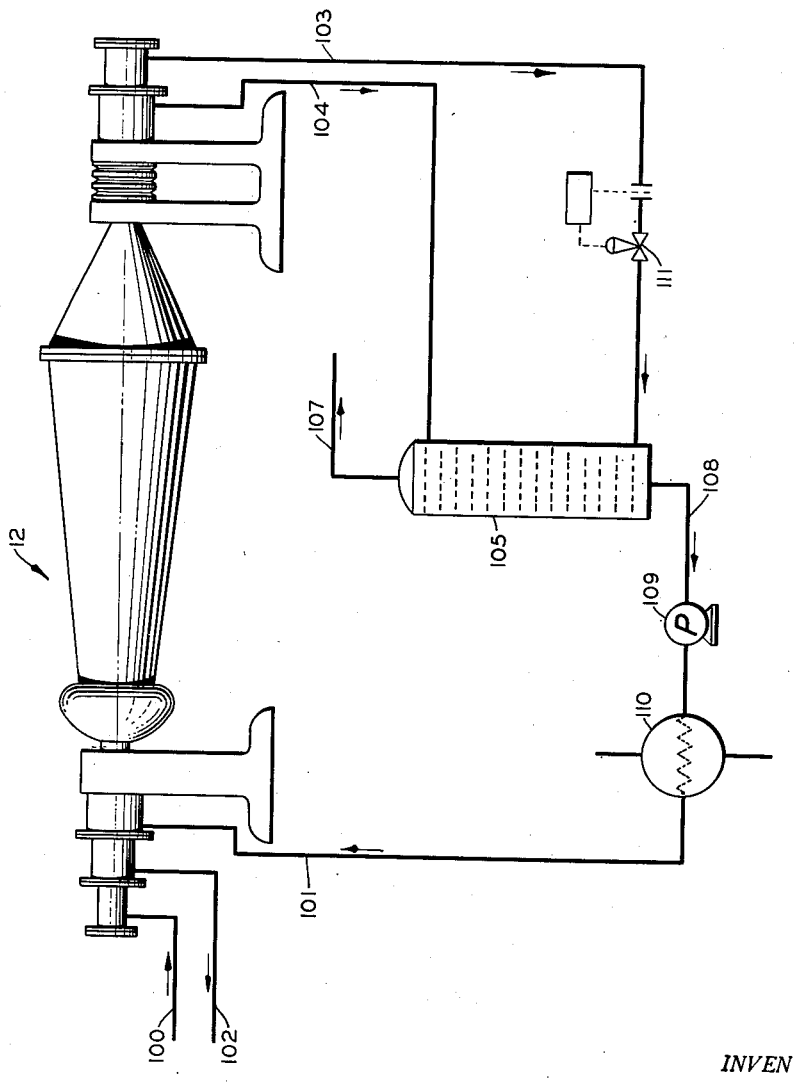
Figures 3 and 4 are flow diagrams wherein the apparatus of Figure 1 is utilized to separate components of a gaseous mixture by selective absorption.

Many of the controls and auxiliaries are not shown by Figure 3. The customary ones may be provided including a heat exchanger 110 to maintain a constant temperature on the system by removing heat generated by inefficiencies in the system, i. e., energy into the oil pump, energy, if any, into the absorber from the synchronous motor minus the Joule-Thompson cooling from the expanding gas and the cooling done by any net useful work delivered by the gas. The auxiliary apparatus also includes an expansion valve 111 to reduce the pressure of the stream in line 103 to a value suitable for charging to the tower 105.

The oil and gas circulations and the separations shown in Figure 3 are for an average operating temperature of 100° F. and are the same as would be obtained in a customary absorption system (with an adequate number of equilibrium steps) where the rich absorption oil would be flashed in two steps (380 and 5 pounds per square inch) with high pressure flashed gas used to strip the oil in the low pressure flash, as shown. The advantage of the present apparatus is in the reduced power requirement. A customary absorption system would require 120 horsepower to operate the oil circulation system. The present system with flows as in Figure 3 requires 43 horsepower (23 for the pump and 20 for the synchronous motor), a saving of 64% over the customary system. Moreover, a customary system would require much more cooling for the oil circulation system because of the greater amount of energy to be dissipated.

Other uses may be made of the higher pressure gas released in the large diameter portions of the absorbers conical evolution chamber. Instead of simply expanding the gas through control valve 111 as shown by Figure 3, it could be expanded through an engine which would deliver power that could be used in pumping the oil and which would deliver cold gas to the separator thereby cooling as well as agitating the oil.

The low temperature would not appreciably change the gas' stripping action since methane solubility does not change with temperature at ordinary conditions.

Alternately, the high pressure gas at about 50 pounds per square inch may be removed and not expanded but delivered directly to fuel lines which usually operate at or somewhat below this pressure. This would save recompression of a large part of the methane which is otherwise a necessity. Stripping gas for the separator may then be obtained by recompressing part of the gas from line 104, which must be recompressed for most uses in any case, and introducing it to the bottom of the separator. The advantage of lower methane concentration is thus lost but the agitation to prevent supersaturation is just as effective. Of course mechanical means of agitating the oil may be used such as stirring or pumping and spraying the oil.

Figure 4:
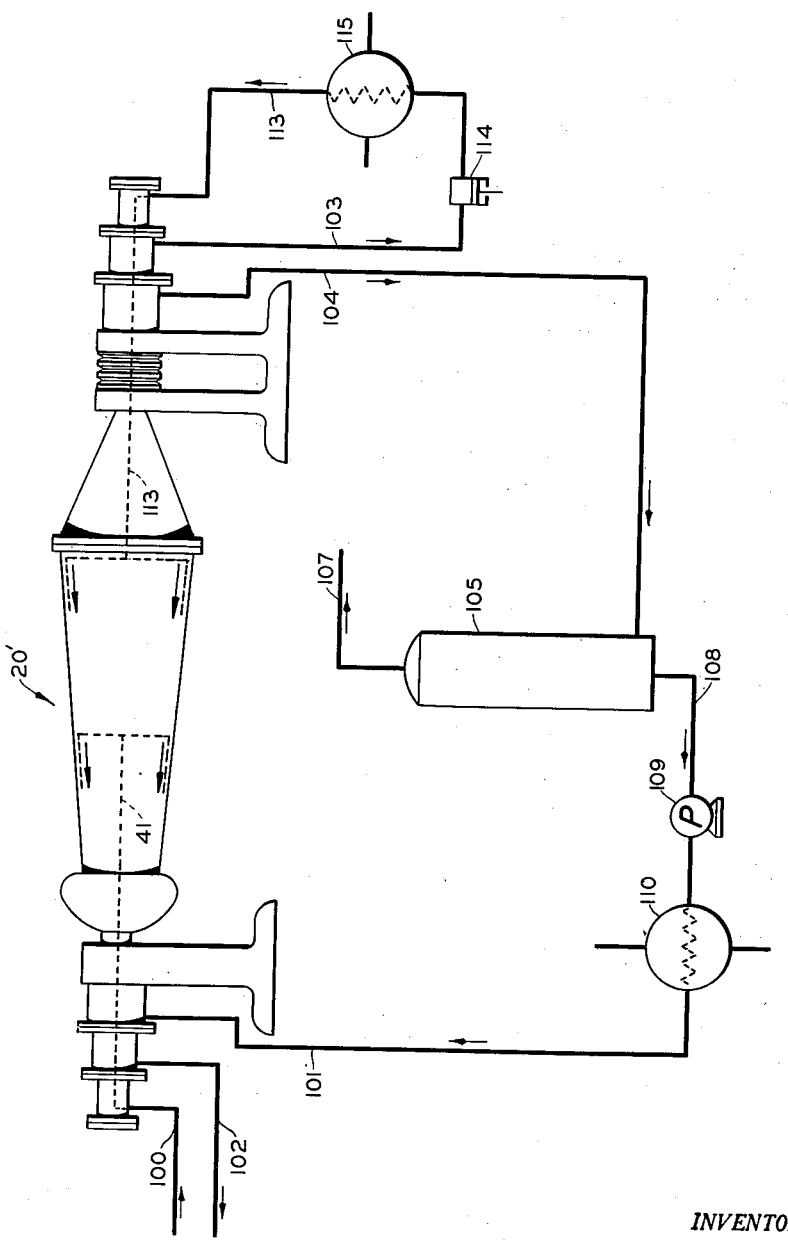

Another use of the first gas released from compartment 85 in the gas evolution section would be as stripping gas in the absorber. This requires adding length to the absorber for use as a stripping section and adding a compressor to recompress the stripping gas. Another connection and conduit through one end of the absorber assembly must be added to handle the stripping gas returning to the apparatus. Figure 4 illustrates this system. At the left side of the absorber 20, the structure and connections are the same as in Figures 1 and 3. At the right side, another line 113 is provided which extends through the center of the shaft 75 to the chamber 57, Figure 1. The stripping gas travels about 18 inches through a narrow annular space similar to passage 53, Figure 1, and is then joined by the main feed gas stream. Thence the flow is the same as described for Figure 1. The gas evolved from the compartment 85, Figure 1, which in the present case has a pressure of 190 pounds per square inch, is thus passed through line 103, a compressor 114, to increase its pressure to about 530 pounds per square inch, and a heat exchanger 115 to line 113 and the frusto-conical stripping section. The apparatus of Figure 4 provides nearly complete recovery of hydrogen. The volume of hydrogen obtained from 400,000 cubic feet of feed is practically the same as obtained from 500,000 cubic feet of feed with flows as in Figure 3. Horsepower requirement for the oil pump is slightly greater but power requirement for the synchronous motor is less because of energy recovered from the large volume of recycle stripping gas circulated. The flow volumes, power requirements, etc., for the stripping gas recycle compressor will be the same for the same oil and gas circulations and purity of products, whether a customary design of absorber with stripping trays is used or the present apparatus.

I claim:

1. Apparatus for countercurrent absorption comprising, in combination, a frusto-conical shell, a drum mounted within said shell and defining a narrow annular passage of progressively increasing diameter therewith, means for feeding gas into the enlarged end of said passage and withdrawing gas from the reduced end of said passage, means for feeding liquid into the reduced end of said passage in countercurrent flow to the gas and withdrawing liquid from the enlarged end of said passage, and means for rotating said shell to form a film of liquid on the inner surface thereof and urge said film longitudinally of said passage by virtue of the shape of said annular passage and centrifugal force against the pressure of said gas.

2. Apparatus for countercurrent absorption comprising, in combination, a support, a rotatable assembly including an elongated frusto-conical shell disposed symmetrically about the axis of rotation of said assembly, a tubular shaft extending axially of said assembly, a drum carried by said shaft defining a narrow annular passage of progressively increasing diameter with the inner surface of said shell, said shell having an enlarged tubular portion concentric with said shaft and journalled in said support, a set of conduits extending respectively, from said enlarged tubular portion to the reduced end of said annular passage for directing liquid into said passage, means for directing gas into the enlarged end of said annular passage, a sleeve secured to said conduits and concentric with said shaft for conveying gas from the reduced end of said annular passage to a gas outlet, means for rotating said shaft to move liquid through said conduits and said annular passage in countercurrent flow to the gas passing through said pasage, the centrifugal force imparted to said liquid by rotation of said assembly moving the liquid through the passage against the pressure of said gas, and means for withdrawing liquid from the enlarged end of said passage.

3. Apparatus for countercurrent absorption comprising, in combination, a stationary bearing structure including three bearings of progressively increasing diameter, each bearing being mounted in a separate chamber, a tubular shaft journalled in the smallest bearing and communicating with the first chamber, a drum carried by said shaft having a generally frusto-conical outer surface, a sleeve journalled in the second bearing and communicating with the second chamber, said sleeve being concentrically disposed with respect to said shaft, an enlarged tubular member journalled in the largest bearing and communicating with the third chamber, a rotatable shell integrally formed with said enlarged tubular member, said shell having a flared end portion and a generally frusto-conical body portion, said body portion defining a narrow annular passage of progressively increasing diameter with said drum, a set of conduits each extending through the interspace between said tubular member and said sleeve, and each having a portion extending along the flared part of the shell to the reduced end of said annular passage, each conduit thereby being adapted to convey liquid from the third chamber to the reduced end of said passage, a liquid inlet communicating with said third chamber, means for feeding gas through the first chamber, the shaft, the enlarged end of said passage, the reduced end of said passage, and said shell to the second chamber, a gas outlet communicating with said second chamber, means for rotating said shell to cause a thin film of liquid to move through said passage in countercurrent flow to the gas, said liquid being forced through the passage by virtue of the frusto-conical shape of said annular passage and centrifugal force against the pressure of said gas, whereby efficient contacting action occurs between the countercurrently moving liquid and gas, and means for withdrawing liquid from the enlarged end of said passage.

4. A desorption unit comprising, in combination, a rotatable shell of tapered configuration, an inlet at the enlarged end of said shell for material consisting of liquid absorbent containing absorbed gases at high pressure, a series of longitudinal vanes supported interiorly of said shell for converting the energy stored in said material to mechanical work, lateral baffles in said shell constructed and arranged to permit passage of liquids in a longitudinal direction at the peripheral region of the shell, said baffles further being constructed and arranged to permit passage of gas through the central regions thereof in a longitudinal direction.

5. A desorption unit comprising, in combination, a stationary support including a bearing structure, a tubular member journalled in said bearing structure, a rotatable, tapered shell having its reduced end integrally formed with said tubular member, an inlet at the peripheral region of the enlarged end of said shell for receiving material consisting of liquid absorbent containing absorbed gases at high pressure, a series of longitudinal vanes mounted within said shell for converting the energy stored in said material to mechanical work, a series of lateral main baffles in said shell dividing it into a series of compartments, each baffle having its outer edge closely spaced to the inner surface of said shell to allow passage of liquid through the shell from the enlarged end to the reduced end thereof while maintaining a predetermined pressure differential between adjacent compartments, each baffle further including vent means at the central region thereof to permit axial flow of gas through the shell while maintaining said predetermined pressure differential between adjacent compartments, a series of lateral subsidiary baffles carried by said vanes, each having an enlarged central opening, said baffles being constructed and arranged to reduce turbulence and thereby increase the efficiency of conversion of the stored energy in said material to mechanical work, and means for withdrawing material at low pressure from the reduced end of said shell.

6. A desorption unit comprising, in combination, a stationary support including a bearing structure, a tubular member disposed journalled in said bearing structure, a rotatable frusto-conical shell having its reduced end integrally formed with said tubular member, a circumferential recess at the enlarged end of said shell, a shaft concentric with said shell and rotatable therewith, a disc carried by said shaft and protruding into said circumferential recess whereby material consisting of liquid absorbent containing absorbed gases at high pressure may be introduced into the enlarged end of said shell through said recess, a series of longitudinal vanes mounted within said shell for converting the energy stored in said material to mechanical work, a series of lateral main baffles in said shell dividing it into a series of compartments, each baffle having its outer edge closely spaced to the inner surface of said shell to allow passage of liquid through the shell from the enlarged end to the reduced end thereof while maintaining a predetermined pressure drop between adjacent compartments, each baffle further including vent means at the central region thereof to permit axial flow of gas through the shell while maintaining said predetermined pressure differential between adjacent compartments, a series of lateral subsidiary baffles carried by said vanes, each having an enlarged central opening, said baffles being constructed and arranged to reduce turbulence and thereby increase the efficiency of conversion of the stored energy in said material to mechanical work, and means for withdrawing material at low pressure from the reduced end of said shell.

7. A desorption unit comprising, in combination, a stationary support including a bearing structure, a tubular member journalled in said bearing structure, a rotatable frusto-conical shell having its reduced end integrally formed with said tubular member, a circumferential recess at the enlarged end of said shell, a tubular shaft concentric with said shell and rotatable therewith, a disc carried by said shaft and protruding into said circumferential recess whereby material consisting of liquid absorbent containing absorbed gases at high pressure may be introduced into the enlarged end of said shell through said recess, a series of longitudinal vanes mounted within said shell for converting the energy stored in said material to mechanical work, a series of lateral main baffles in said shell dividing it into a series of compartments, each baffle having its outer edge closely spaced to the inner surface of said shell to allow passage of liquid through the shell from the enlarged end to the reduced end thereof while maintaining a predetermined pressure differential between adjacent compartments, said tubular shaft communicating with the central region of the first compartment at the enlarged end of the shell to withdraw gas at high pressure therefrom, each baffle further including vent means at the central region thereof to permit axial flow of gas through the shell while maintaining said predetermined pressure differential between adjacent compartments, a series of lateral subsidiary baffles carried by said vanes, each having an enlarged central opening to reduce turbulence and thereby increase the efficiency of conversion of the stored energy in said material to mechanical work, and means for withdrawing material at low pressure from the reduced end of said shell.

8. A desorption unit comprising, in combination, a stationary support including a bearing structure, a tubular member journalled in said bearing structure, a frusto-conical shell having its reduced end integrally formed with said tubular member, a circumferential recess at the enlarged end of said shell, a tubular shaft concentric with said shell and rotatable therewith, a disc carried by said shaft and protruding into said circumferential recess whereby material consisting of liquid absorbent containing absorbed gases at high pressure may be introduced into the enlarged end of said shell through said recess, a series of longitudinal vanes mounted within said shell for converting the energy stored in said material to mechanical work, a series of lateral main baffles in said shell dividing it into a series of compartments, each baffle having its outer edge closely spaced to the inner surface of said shell to allow passage of liquid through the shell from the enlarged end to the reduced end thereof while maintaining a predetermined pressure drop between adjacent compartments, said tubular shaft communicating with the central region of the first compartment at the enlarged end of the shell to withdraw gas at high pressure therefrom, each baffle further including a relief valve at the central region thereof to permit axial flow of gas through the shell while maintaining said predetermined pressure differential between adjacent compartments, a series of lateral subsidiary baffles carried by said vanes, each having an enlarged central opening and having their peripheral regions closely spaced to the inner surface of said shell, to reduce turbulence and thereby increase the efficiency of conversion of the stored energy in said material to mechanical work, and means for withdrawing material at low pressure from the reduced end of said shell.

9. Apparatus for countercurrent absorption comprising, in combination, a frusto-conical shell, a drum mounted within said shell and defining a narrow annular passage of progressively increasing diameter therewith, means for feeding gas into the enlarged end of said passage and withdrawing gas from the reduced end of said passage, means for feeding liquid into the reduced end of said passage in countercurrent flow to the gas, and means for rotating said shell to form a film of liquid on the inner surface thereof and move said film longitudinally of said passage by virtue of the frusto-conical shape of said annular passage and centrifugal force against the pressure of said gas, a second rotatable frusto-conical shell having its enlarged end positioned adjacent the enlarged end of the first shell, an inlet for liquid absorbent material containing absorbed gases at high pressure at the peripheral region of the enlarged end of the second shell, a series of longitudinal vanes supported interiorly of said second shell for converting the energy stored in said material to mechanical work, lateral baffles in said second shell constructed and arranged to permit passage of liquids in a longitudinal direction at the peripheral region of the shell, said baffles further being constructed and arranged to permit passage of gas through the central regions thereof in a longitudinal direction, and means for withdrawing material at low pressure from the reduced end of said second shell.

10. Apparatus for countercurrent absorption comprising, in combination, a support, a rotatable assembly journalled in said support including an elongated frusto-conical shell disposed symmetrically about the axis of rotation of said assembly, a tubular shaft journalled in said support and extending axially of said assembly, a drum carried by said shaft defining a narrow annular passage of progressively increasing diameter with the inner surface of said shell, said shell having an enlarged tubular portion concentric with said shaft and journalled in said support, means for feeding gas to the enlarged end of said passage, a set of conduits extending, respectively, from said enlarged tubular portion to the reduced end of said annular passage, means for feeding liquid through said conduits to said passage, a sleeve secured to said conduits and concentric with said shaft for conveying gas from the reduced end of said annular passage to a gas outlet, means for rotating said shaft to move liquid through said conduits and said annular passage in counter-current flow to the gas passing therethrough, the centrifugal force imparted to said liquid in said annular passage by rotation of said assembly moving the liquid through the passage against the pressure of said gas, a second rotatable frusto-conical shell journalled in said support and having its enlarged end supported adjacent the enlarged end of the first shell, an inlet at the enlarged end of the second shell for material consisting of liquid absorbent containing absorbed gases at high pressure, a series of longitudinal vanes supported interiorly of said shell for converting the energy stored in said material to mechanical work, lateral baffles in said shell constructed and arranged to permit passage of liquids in a longitudinal direction at the peripheral region of the shell, said baffles further being constructed and arranged to permit passage of gas through the central regions thereof in a longitudinal direction, and means for withdrawing material at low pressure from the reduced end of said shell.

11. Apparatus for countercurrent absorption comprising, in combination, a support, a rotatable assembly including an elongated frusto-conical shell disposed symmetrically about the axis of rotation of said assembly, a tubular shaft extending axially of said assembly, a drum carried by said shaft defining a narrow annular passage of progressively increasing diameter with the inner surface of said shell, said assembly having an enlarged tubular portion concentric with said shaft and journalled in said support, a set of conduits extending, respectively, from said enlarged tubular portion to the reduced end of said annular passage, means for directing liquid through said conduits into said passage, means for directing gas into the enlarged end of said annular passage, a sleeve secured to said conduits and concentric with said shaft for conveying spent gas from the reduced end of said annular passage to a gas outlet, means for rotating said shaft to move said liquid through said conduits and said annular passage in countercurrent flow to the gas passing through said passage, the centrifugal force imparted to said liquid in said annular passage by rotation of said assembly moving the liquid through the passage against the pressure of said gas, a second frusto-conical shell journalled in said support and having its enlarged end secured to the enlarged end of the first shell, a circumferential recess at the enlarged end of the second shell, a tubular shaft carried by the second shell and disposed axially thereof, a disc carried by said shaft and extending into said recess whereby liquid containing absorbed gas from said first shell is adapted to pass through said recess into said second shell under the influence of centrifugal force, a series of longitudinal vanes mounted within said shell for converting the energy stored in said liquid containing absorbed gas to mechanical work, a series of lateral main baffles in said shell dividing it into a series of compartments, each baffle having its outer edge closely spaced to the inner surface of said shell to allow passage of liquid through the shell from the enlarged end to the reduced end thereof while maintaining a predetermined pressure differential between adjacent compartments, each baffle further including vent means at the central region thereof to permit axial flow of gas through the shell while maintaining said predetermined pressure differential between adjacent compartments, a series of lateral subsidiary baffles carried by said vanes, each having an enlarged central opening to reduce turbulence and thereby increase the efficiency of conversion of the stored energy in said liquid to mechanical work, and means for withdrawing material at low pressure from the reduced end of said shell.

12. Apparatus for countercurrent absorption comprising, in combination, a support, a rotatable assembly journalled in said support including an elongated frusto-conical shell disposed symmetrically about the axis of rotation of said assembly, a tubular shaft extending axially of said assembly and journalled in said support, a drum carried by said shaft defining a narrow annular passage of progressively increasing diameter with the inner surface of said shell, said assembly having an enlarged tubular portion concentric with said shaft and journalled in said support, a set of conduits extending, respectively, from said enlarged tubular portion to the reduced end of said annular passage, means for directing liquid through said conduits into said passage, means for directing gas into the enlarged end of said annular passage, a sleeve secured to said conduits and concentric with said shaft for conveying spent gas from the reduced end of said annular passage to a gas outlet, means for rotating said shaft to move said liquid through said conduits and said annular passage in countercurrent flow to the gas passing through said passage, the centrifugal force imparted to said liquid in said annular passage by rotation of said assembly moving the liquid through the passage against the pressure of said gas, a second rotatable frusto-conical shell journalled in said support and having its enlarged end secured to the enlarged end of the first shell, a circumferential recess at the enlarged end of the second shell, a tubular shaft carried by the second shell and disposed axially thereof, a disc carried by said shaft and extending into said recess whereby liquid containing absorbed gas from said first shell is adapted to pass through said recess into said second shell under the influence of centrifugal force, a series of longitudinal vanes mounted within said shell for converting the energy stored in said liquid containing absorbed gas to mechanical work, a series of lateral main baffles in said shell dividing it into a series of compartments, each baffle having its outer edge closely spaced to the inner surface of said shell to allow passage of liquid through the shell from the enlarged end to the reduced end thereof while maintaining a predetermined pressure differential between adjacent compartments, said tubular shaft communicating with the first compartment at the enlarged end of the shell to withdraw gas at high pressure envolved in said first compartment, each baffle further including a relief valve positioned at the central region thereof to permit axial flow of gas through the shell while maintaining said predetermined pressure differential between adjacent compartments, and means for withdrawing material at low pressure from the reduced end of said shell.

13. Apparatus for countercurrent absorption comprising, in combination, a frusto-conical shell, structure mounted within said shell and cooperating therewith to define a narrow annular passage of progressively increasing diameter, means for feeding gas into the enlarged end of said passage and withdrawing gas from the reduced end of said passage, means for feeding liquid into the reduced end of said passage in countercurrent flow to the gas and withdrawing liquid from the enlarged end of said passage, and means for rotating said shell to form a film of liquid on the inner surface thereof and urge said film longitudinally of said passage by virtue of the shape of said annular passage and centrifugal force against the pressure of said gas.

KARL H. HACHMUTH.

REFERENCES CITED

The following references are of record in the file of this patent:

UNITED STATES PATENTS

| Number | Name | Date |
|---|---|---|
| 702,795 | Holmes | June 17, 1902 |
| 2,044,996 | Podbielniak | June 23, 1936 |
| 2,356,404 | Heller | Aug. 22, 1944 |
| 2,422,882 | Bramley | June 24, 1947 |

OTHER REFERENCES

"Journal of Applied Physics," by Roebuck; vol. 16, pages 285, 286.